United States Patent
Tanigawa et al.

(10) Patent No.: US 8,967,521 B2
(45) Date of Patent: Mar. 3, 2015

(54) FILAMENT WINDING DEVICE

(75) Inventors: Motohiro Tanigawa, Kyoto (JP); Tadashi Uozumi, Kyoto (JP); Daigoro Nakamura, Kyoto (JP); Ken Hatta, Toyota (JP)

(73) Assignees: Murata Machinery, Ltd., Kyoto (JP); Toyota Jidosha Kabushiki Kaisha, Aichi (JP)

( * ) Notice: Subject to any disclaimer, the term of this patent is extended or adjusted under 35 U.S.C. 154(b) by 163 days.

(21) Appl. No.: 13/876,155

(22) PCT Filed: Sep. 21, 2011

(86) PCT No.: PCT/JP2011/071534
§ 371 (c)(1),
(2), (4) Date: Mar. 26, 2013

(87) PCT Pub. No.: WO2012/043345
PCT Pub. Date: Apr. 5, 2012

(65) Prior Publication Data
US 2013/0186996 A1     Jul. 25, 2013

(30) Foreign Application Priority Data
Sep. 27, 2010   (JP) .................................. 2010-215879

(51) Int. Cl.
B65H 39/16    (2006.01)
B29C 53/80    (2006.01)
B29C 53/60    (2006.01)

(52) U.S. Cl.
CPC ........... *B29C 53/8016* (2013.01); *B29C 53/602* (2013.01)
USPC ......... 242/444.4; 242/443; 242/444; 242/447

(58) Field of Classification Search
USPC ........................ 242/438, 443, 444, 444.4, 447
See application file for complete search history.

(56) References Cited

U.S. PATENT DOCUMENTS

| | | | |
|---|---|---|---|
| 2003/0052212 A1* | 3/2003 | Anderson et al. | 242/436 |
| 2009/0126875 A1 | 5/2009 | Uozumi et al. | 156/425 |
| 2009/0127373 A1 | 5/2009 | Uozumi et al. | 242/436 |
| 2009/0314418 A1 | 12/2009 | Uozumi et al. | |
| 2010/0032510 A1 | 2/2010 | Tanigawa et al. | 242/430 |

FOREIGN PATENT DOCUMENTS

| | | |
|---|---|---|
| JP | 2009-119732 | 6/2009 |
| JP | 2009-119803 | 6/2009 |

(Continued)

OTHER PUBLICATIONS

English language translation of international preliminary report on patentability dated Apr. 16, 2013 issued in corresponding PCT application PCT/JP2011/071534 cites the foreign patent document listed above.

*Primary Examiner* — Emmanuel M Marcelo
(74) *Attorney, Agent, or Firm* — DLA Piper LLP (US)

(57) ABSTRACT

A filament winding device that optimizes the interval between adjacent fiber bundle guides includes a plurality of helical heads on which fiber bundle guides moving in the direction that is roughly perpendicular to the rotating axis of a liner are radially disposed; and winds a fiber bundle onto the outer circumference surface of the liner by passing the helical heads while rotating the liner. An interval adjusting means adjusts the interval between a virtual plane (Pf) which intersects with the guiding opening of a fiber bundle guide disposed on one of the helical heads so as to be orthogonal to the liner rotating axis and a virtual plane (Pw) which intersects with the guiding opening of a fiber bundle guide disposed on the other helical head so as to be orthogonal to the liner rotating axis.

3 Claims, 8 Drawing Sheets

(56) References Cited

FOREIGN PATENT DOCUMENTS

| JP | 2010-005831 | 1/2010 |
| JP | 2010000692 A | 1/2010 |
| JP | 2010005831 A | 1/2010 |
| JP | 2010-036461 | 2/2010 |

* cited by examiner

FILAMENT WINDING DEVICE

CROSS REFERENCE TO RELATED APPLICATIONS

This application is a national stage of international application PCT/JP2011/071534, filed on Sep. 21, 2011, and claims the benefit of priority under 35 USC 119 of Japanese application 2010-215879, filed on Sep. 27, 2010, which are incorporated herein by reference.

TECHNICAL FIELD

The present invention relates to an art of a filament winding device.

BACKGROUND ART

Conventionally, a filament winding device is known which winds fiber bundles, into which resin is infiltrated, onto an outer peripheral surface of a liner. The filament winding device has a helical head in which a plurality of fiber bundle guides are provided radially so that a plurality of fiber bundles can be wound onto the outer peripheral surface of the rotating liner simultaneously (for example, see the Patent Literature 1).

However, in such a filament winding device, the fiber bundle guides must be moved to an optimal position corresponding to the outer diameter of the liner. The fiber bundle guides adjacent to each other are required not to interfere even when the fiber bundle guides are moved so as to be close to the rotational axis of the liner.

Then, in such a filament winding device, an art is required for optimizing the interval between the fiber bundle guides adjacent to each other so as to prevent the interference between the fiber bundle guides. Namely, an art is required for optimizing the interval between the fiber bundle guides adjacent to each other even when the fiber bundle guides are moved corresponding to the outer diameter of the liner.

PRIOR ART REFERENCE

Patent Literature

Patent Literature 1: the Japanese Patent Laid Open Gazette 2010-36461

DISCLOSURE OF INVENTION

Summary of the Invention

Problems to be Solved by the Invention

The purpose of the present invention is to provide an art for optimizing an interval between fiber bundle guides adjacent to each other even when the fiber bundle guides are moved corresponding to an outer diameter of a liner.

Means for Solving the Problems

Next, an explanation will be given on means for solving the problems.

According to the first invention, a filament winding device includes a plurality of helical heads in which fiber bundle guides moved substantially perpendicularly to a rotational axis of a liner are provided radially. The liner passes through the helical heads while being rotated so as to wind a fiber bundle onto an outer peripheral surface of the liner. An interval adjusting means is provided which adjusts an interval between a virtual plane perpendicular to the rotational axis of the liner and intersecting a guiding opening of the fiber bundle guide provided in one of the helical heads and a virtual plane perpendicular to the rotational axis of the liner and intersecting a guiding opening of the fiber bundle guide provided in another helical head.

According to the second invention, in the filament winding device according to the first invention, when the fiber bundle guide is moved so as to be close to the rotational axis of the liner, the interval adjusting means separates the virtual plane perpendicular to the rotational axis of the liner and intersecting the guiding opening of the fiber bundle guide provided in the another helical head from the virtual plane perpendicular to the rotational axis of the liner and intersecting the guiding opening of the fiber bundle guide provided in the one of the helical heads.

According to the third invention, in the filament winding device according to the first invention, when the fiber bundle guide is moved so as to be separated from the rotational axis of the liner, the interval adjusting means makes the virtual plane perpendicular to the rotational axis of the liner and intersecting the guiding opening of the fiber bundle guide provided in the another helical head close to the virtual plane perpendicular to the rotational axis of the liner and intersecting the guiding opening of the fiber bundle guide provided in the one of the helical heads.

Effect of the Invention

The present invention brings following effects.

According to the first invention, the distance in the direction of the rotational axis of the liner between the fiber bundle guide provided in the one helical head and the fiber bundle guide provided in the another helical head can be adjusted. Accordingly, the interval between the adjacent fiber bundle guides can be optimized.

According to the second invention, when the fiber bundle guide is moved so as to be close to the rotational axis of the liner, the interval in the direction of the rotational axis of the liner between the fiber bundle guide provided in the one helical head and the fiber bundle guide provided in the another helical head can be increased. Accordingly, the interval between the fiber bundle guides adjacent to each other can be optimized so as to prevent the interference.

According to the third invention, when the fiber bundle guide is moved so as to be separated from the rotational axis of the liner, the interval in the direction of the rotational axis of the liner between the fiber bundle guide provided in the one helical head and the fiber bundle guide provided in the another helical head can be reduced. Accordingly, the interval between the fiber bundle guides adjacent to each other can be optimized so as to prevent the interference.

DETAILED DESCRIPTION OF THE INVENTION

Firstly, an explanation will be given on entire construction of a filament winding device (hereinafter, referred to as "FW device") 100 according to an embodiment of the present invention referring to FIG. 1.

Figure 1:
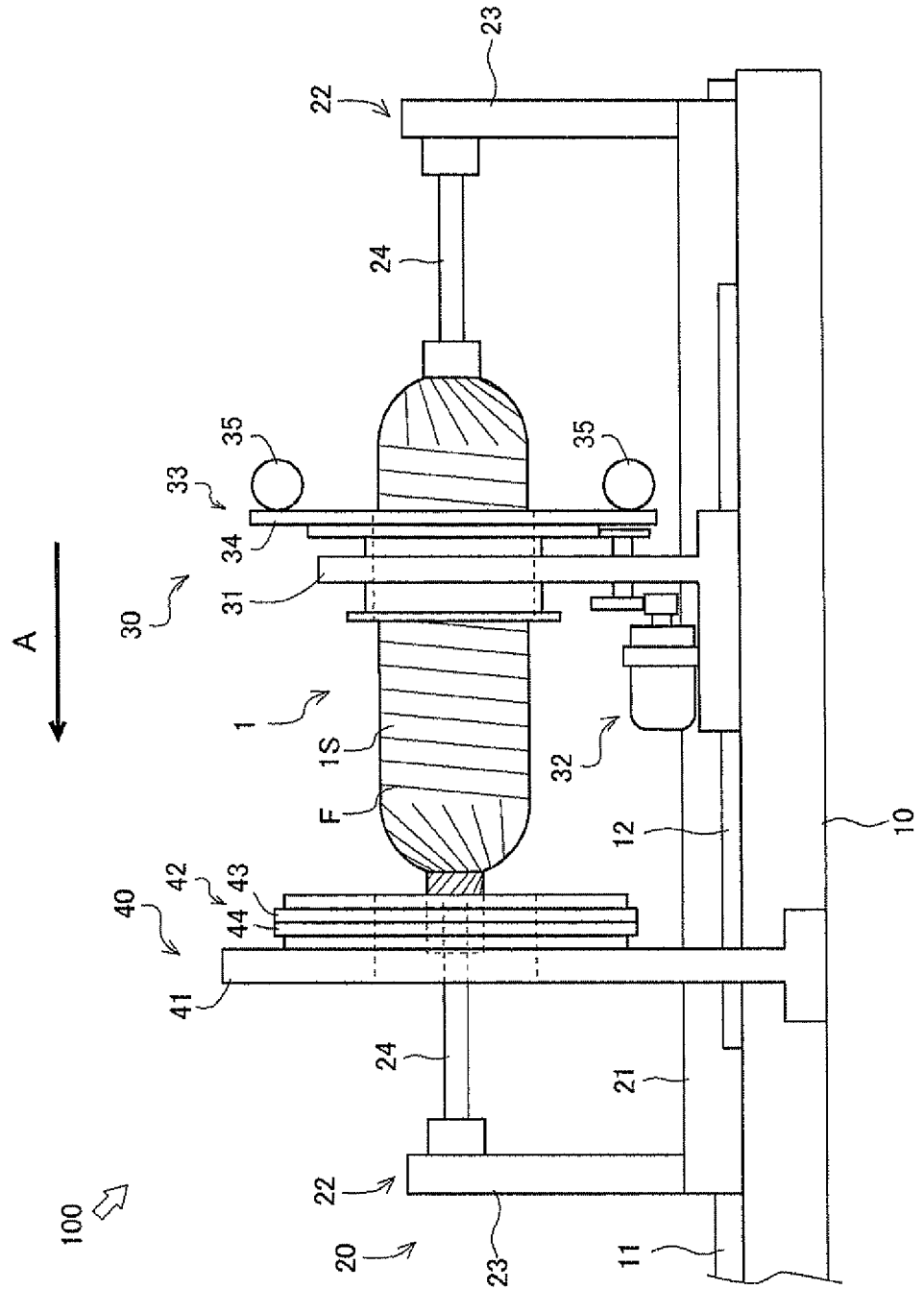
FIG. 1 is a drawing of a filament winding device 100 according to an embodiment of the present invention.

FIG. 1 is a side view of the FW device 100. An arrow A in the drawing shows a transport direction of a liner 1. The direction parallel to the transport direction of the liner 1 is defined as the longitudinal direction of the FW device 100, and one of the sides of the transport direction of the liner 1 is defined as the front side (left side in the drawing) and the other thereof is defined as the rear side (right side in the drawing). For moving reciprocally the liner 1 along the longitudinal direction, the front and rear sides of the FW device 100 is determined in accordance with the transport direction of the liner 1.

The FW device 100 winds a fiber bundle F onto an outer peripheral surface 1S of the liner 1. The FW device 100 mainly includes a main pedestal 10, a liner transport device 20, a hoop winding device 30 and a helical winding device 40.

The liner 1 is a substantially cylindrical hollow vessel formed by high-intensity aluminum material, polyamide resin or the like for example. The pressure resistance of the liner 1 is improved by winding the fiber bundle F onto the outer peripheral surface 1S of the liner 1. Namely, the liner 1 is a base material constituting a pressure-resistant vessel.

The main pedestal 10 is a main structure constituting the basis of the FW device 100. In the upper portion of the main pedestal 10, a rail 11 for the liner transport device is provided. The liner transport device 20 is mounted on the rail 11. In the upper portion of the main pedestal 10, a rail 12 for the hoop winding device is provided in parallel to the rail 11. The hoop winding device 30 is mounted on the rail 12.

According to the construction, while constituting the basis of the FW device 100, the main pedestal 10 enables the liner transport device 20 and the hoop winding device 30 to move along the longitudinal direction of the FW device 100.

The liner transport device 20 moves the liner 1 while rotating the liner 1. In detail, the liner transport device 20 rotates the liner 1 about the longitudinal direction of the FW device 100 as a rotation axis and transports the liner 1 along the longitudinal direction of the FW device 100. The liner transport device 20 mainly includes a pedestal 21 and liner support parts 22.

In the pedestal 21, a pair of the liner support parts 22 is provided in the upper portion of the pedestal 21. The liner support part 22 includes a liner support frame 23 and a rotational shaft 24, and rotates the liner 1.

Concretely, the liner support part 22 includes the liner support frame 23 extended upward from the pedestal 21, and the rotational shaft 24 extended longitudinally from the liner support frame 23. Then, the liner 1 attached to the rotational shaft 24 is rotated only one direction by a power mechanism (not shown).

According to the construction, the liner transport device 20 can rotate the liner 1 about the longitudinal direction of the FW device 100 as the rotation axis and can transport the liner 1 along the longitudinal direction of the FW device 100.

The hoop winding device 30 winds the fiber bundle F onto the outer peripheral surface 1S of the liner 1. In detail, the hoop winding device 30 performs so-called hoop winding in which a winding angle θ of the fiber bundle F (see FIG. 2) is substantially perpendicular to the longitudinal direction of the FW device 100. The hoop winding device 30 mainly includes a pedestal 31, a power mechanism 32 and a hoop mounting device 33.

In the pedestal 31, the hoop mounting device 33 rotated by the power mechanism 32 is provided. The hoop mounting device 33 includes a mounting table 34 and a bobbin 35, and performs the hoop winding on the outer peripheral surface 1S of the liner 1.

Concretely, the hoop mounting device 33 mainly includes the mounting table 34 performing the hoop winding and the bobbin 35 supplying the fiber bundle F to the mounting table 34. The fiber bundle F is guided to the outer peripheral surface 1S of the liner 1 by a fiber bundle guide provided in the mounting table 34, and the hoop winding is performed by rotating the mounting table 34.

According to the construction, the hoop winding device 30 can perform the hoop winding in which the winding angle θ of the fiber bundle F (see FIG. 2) is substantially perpendicular to the longitudinal direction of the FW device 100. In the FW device 100, by controlling the moving speed of the hoop winding device 30 and the rotation speed of the mounting table 34, the winding mode of the fiber bundle F can be changed freely.

The helical winding device 40 winds the fiber bundle F onto the outer peripheral surface 1S of the liner 1. In detail, the helical winding device 40 performs so-called helical winding in which the winding angle θ of the fiber bundle F (see FIG. 2) is a predetermined value about the longitudinal direction of the FW device 100. The helical winding device 40 mainly includes a pedestal 41 and a helical mounting device 42.

In the pedestal 41, the helical mounting device 42 is provided. The helical mounting device 42 includes a first helical head 43 and a second helical head 44, and performs the helical winding on the outer peripheral surface 1S of the liner 1. In the helical winding device 40 of the FW device 100, the two helical heads, that is, the first helical head 43 and the second helical head 44 are provided. However, three or more helical heads may alternatively be provided.

Concretely, the helical mounting device 42 mainly includes the first helical head 43 performing the helical winding and the second helical head 44 also performing the helical winding. The fiber bundle F is guided to the outer peripheral surface 1S of the liner 1 by a first fiber bundle guide 91 provided in the first helical head 43 and a second fiber bundle guide 92 provided in the second helical head 44 (see FIG. 2), and the helical winding is performed by the passing of the liner 1 while rotating. The fiber bundle F is supplied to the first helical head 43 and the second helical head 44 by a bobbin (not shown).

According to the construction, the helical winding device 40 can perform the helical winding in which the winding angle θ of the fiber bundle F (see FIG. 2) is a predetermined value about the longitudinal direction of the FW device 100. In the FW device 100, by controlling the transport speed and rotation speed of the liner 1, the winding mode of the fiber bundle F can be changed freely.

Next, an explanation will be given on the first helical head 43 and the second helical head 44 constituting the helical winding device 40 in more detail referring to FIG. 2.

Figure 2:
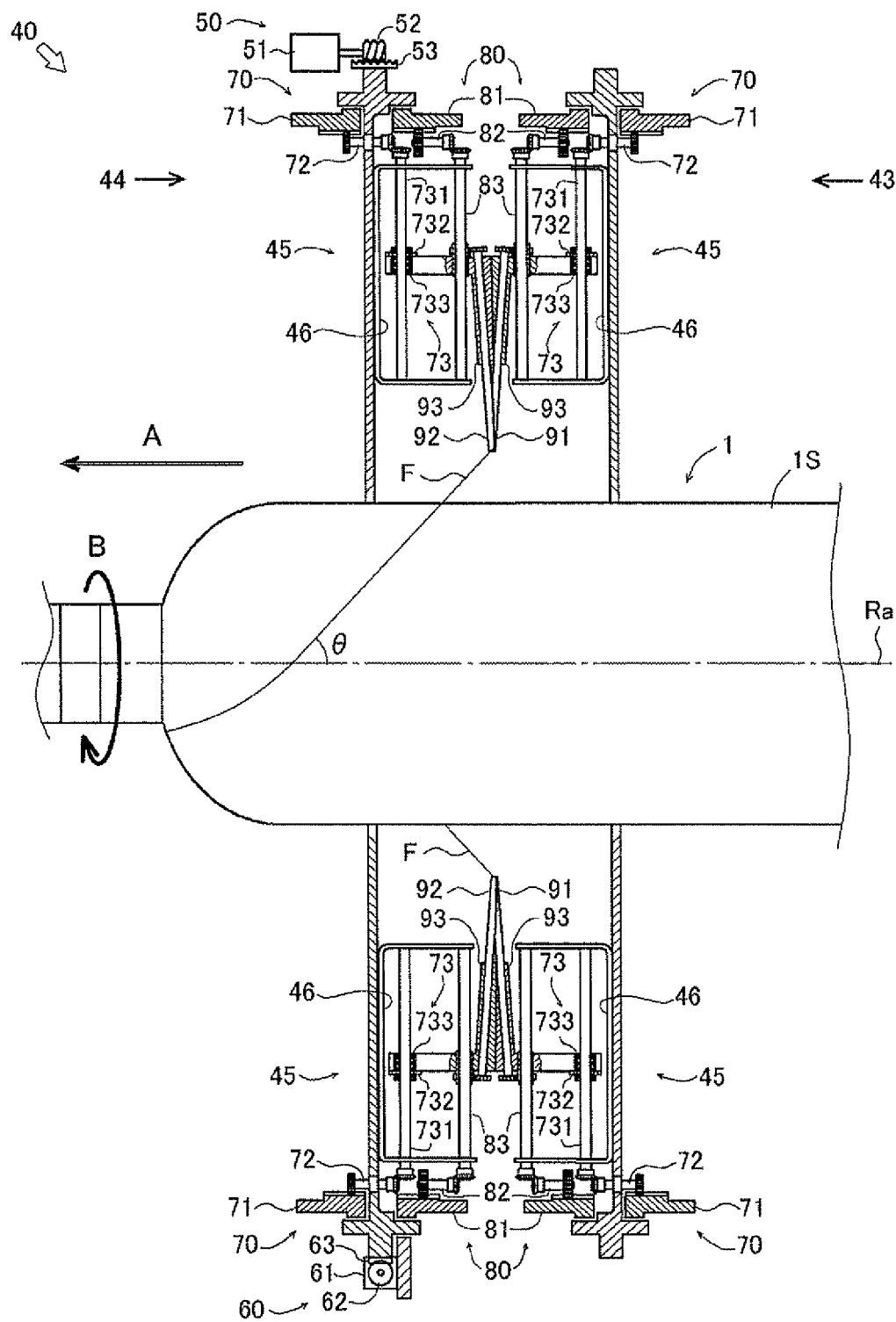
FIG. 2 is a drawing of a first helical head 43 and a second helical head 44 constituting a helical winding device 40.

FIG. 2 is a side view of the first helical head 43 and the second helical head 44. An arrow A in the drawing shows a transport direction of the liner 1. An arrow B in the drawing shows a rotation direction of the liner 1.

As mentioned above, the helical winding device 40 performs the helical winding in which the winding angle θ of the fiber bundle F is a predetermined value about the longitudinal direction of the FW device 100. The first helical head 43 and the second helical head 44 constituting the helical winding device 40 are arranged so as to be adjacent to each other along the transport direction of the liner 1. The second helical head 44 is provided with a phase difference PA so that the second fiber bundle guide 92 provided in the second helical head 44 is positioned between the first fiber bundle guides 91 provided in the first helical head 43 (see FIG. 4A and FIG. 5A).

In the first helical head 43, the first fiber bundle guides 91 are provided radially centering on a rotational axis Ra of the liner 1. Concretely, by guide support devices 45 attached radially to the first helical head 43, the first fiber bundle guides 91 are supported movably and rotatably.

Accordingly, the first helical head 43 can guide the plurality of the fiber bundles F simultaneously to the outer peripheral surface 1S of the liner 1. Since 90 first fiber bundle guides 91 are provided in the first helical head 43 of the FW device 100, 90 fiber bundles F can be guided simultaneously.

In the second helical head 44, the second fiber bundle guides 92 are provided radially centering on the rotational axis Ra of the liner 1. Concretely, by guide support devices 45 attached radially to the second helical head 44, the second fiber bundle guides 92 are supported movably and rotatably.

Accordingly, the second helical head 44 can guide the plurality of the fiber bundles F simultaneously to the outer peripheral surface 1S of the liner 1. Since 90 second fiber bundle guides 92 are provided in the second helical head 44 of the FW device 100, 90 fiber bundles F can be guided simultaneously.

According to the construction, the first helical head 43 and the second helical head 44 can guide the plurality of the fiber bundles F (in the FW device 100, 180 fiber bundles F) simultaneously to the outer peripheral surface 1S of the liner 1 so as to perform the helical winding.

In the FW device 100, an interval adjusting means 50 driving the second helical head 44 in the direction of the rotational axis Ra (the longitudinal direction) of the liner 1 is provided. In other words, in the FW device 100, the interval adjusting means 50 drives the second helical head 44 in the longitudinal direction of the FW device 100.

A driving device 50 as the interval adjusting means 50 includes a worm gear 52 rotated by an electric motor 51 and a rack gear 53 fixed to the second helical head 44. The driving device 50 drives the second helical head 44 by the rotational power of the electric motor 51.

Figure 4:
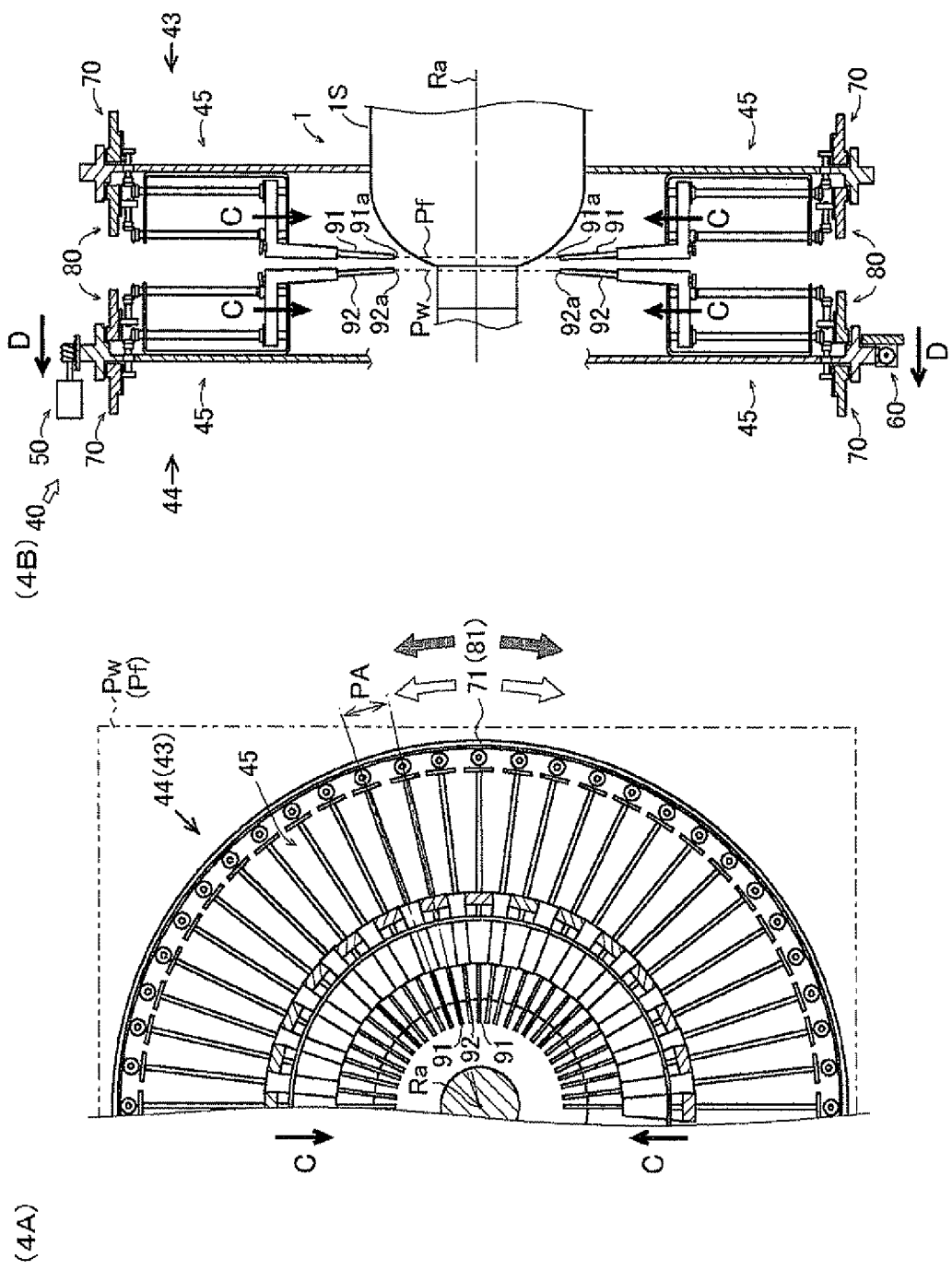
FIG. 4A is a front view and FIG. 4B is a side view of the state in which a first fiber bundle guide 91 and a second fiber bundle guide 92 are moved so as to be close to a rotational axis Ra of a liner 1.
Figure 5:
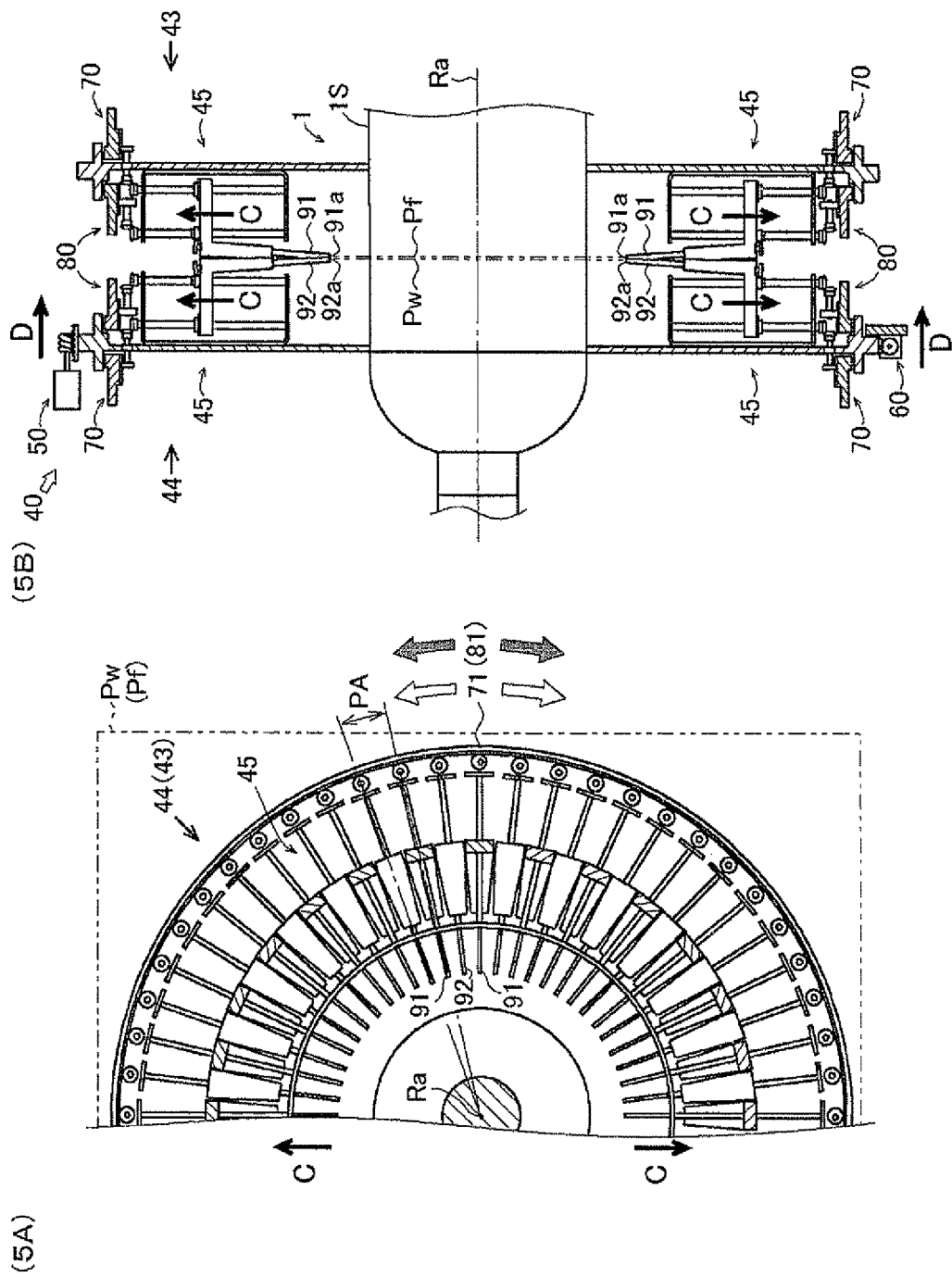
FIG. 5A is a front view and FIG. 5B is a side view of the state in which the first fiber bundle guide 91 and the second fiber bundle guide 92 are moved so as to be separated from the rotational axis Ra of the liner 1.

According to the construction, the driving device 50 can drive the second helical head 44 along the direction of the rotational axis Ra (the longitudinal direction) of the liner 1 so as to make the second helical head 44 close to or separate from the first helical head 43 (see FIG. 4B and FIG. 5B).

In the FW device 100, a phase adjusting means 60 driving the second helical head 44 in the peripheral direction of the liner 1 is provided. In other words, in the FW device 100, the phase adjusting means 60 drives the second helical head 44 centering on the rotational axis Ra of the liner 1.

A driving device 60 as the phase adjusting means 60 includes a worm gear 62 rotated by an electric motor 61 and a rack gear 63 fixed to the second helical head 44. The driving device 60 drives the second helical head 44 by the rotational power of the electric motor 61.

According to the construction, the driving device 60 can drive the second helical head 44 in the peripheral direction of the liner 1 so as to adjust a phase difference PA between the first fiber bundle guides 91 and the second fiber bundle guides 92 (see FIG. 4A and FIG. 5A).

In below explanation, the first helical head 43 which is fixed to the pedestal 41 and is not driven is defined as a fixed helical head 43, and the second helical head 44 which is driven by the driving device 50 is defined as a movable helical head 44.

Next, an explanation will be given on the guide support devices 45 constituting the fixed helical head 43 and the movable helical head 44 in more detail referring to FIG. 3. Herein, the guide support device 45 attached to the movable helical head 44 is shown in the drawing and explained.

Figure 3:
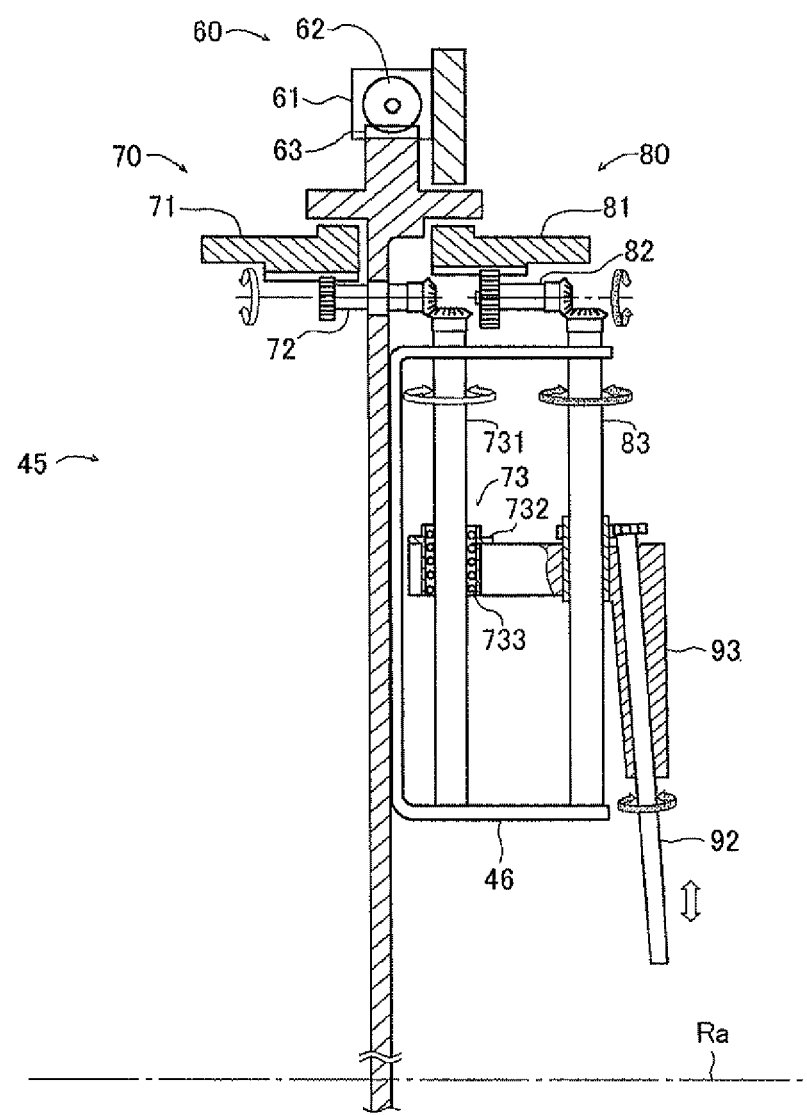
FIG. 3 is a drawing of a guide support device 45 constituting the first helical head 43 and the second helical head 44.

FIG. 3 is a side view of the guide support device 45. Outlined white arrows in the drawing show action directions of members constituting a movement mechanism 70. Outlined black arrows in the drawing show action directions of members constituting a rotation mechanism 80.

The guide support device 45 is attached to each of the fixed helical head 43 and the movable helical head 44 so as to support the first fiber bundle guides 91 or the second fiber bundle guides 92 movably and rotatably. The guide support device 45 includes the movement mechanism 70 and the rotation mechanism 80.

The movement mechanism 70 moves the second fiber bundle guides 92 substantially perpendicularly to the rotational axis Ra of the liner 1. The movement mechanism 70 mainly includes a rotational cylinder 71, an intermediate shaft 72 and a ball screw 73.

The rotational cylinder 71 is a circular member whose inner peripheral surface is formed therein with an internal gear. The rotational cylinder 71 is arranged coaxially to the rotational axis Ra of the liner 1 and is rotated by an electric motor (not shown) (see the outlined white arrow in FIG. 4A and FIG. 5A). The rotational direction of the rotational cylinder 71 is changed by the normal or reverse rotation the electric motor.

The intermediate shaft 72 is a shaft-like member transmitting the rotational action of the rotational cylinder 71 to a spiral shaft 731 constituting the ball screw 73. A pinion gear provided at one of the ends of the intermediate shaft 72 is meshed with the internal gear of the rotational cylinder 71. A bevel gear provided at the other end of the intermediate shaft 72 is meshed with a bevel gear of the spiral shaft 731.

The ball screw 73 exchanges the rotational action of the spiral shaft 731 rotated by the intermediate shaft 72 into sending action of a guide support member 93. Hereinafter, an explanation will be given on the structure of the ball screw 73 in more detail. The ball screw 73 mainly includes the spiral shaft 731, a ball nut 732 and steel balls 733.

The spiral shaft 731 is a shaft-like member rotated by the intermediate shaft 72. In the outer peripheral surface of the spiral shaft 731, a groove which is shaped arc-like when viewed in section is bore spirally. The spiral shaft 731 is supported rotatably by a circular member 46 which is C-like shaped when viewed in section.

The ball nut 732 is a cylindrical member engaged with the outside of the spiral shaft 731. In the inner peripheral surface of the ball nut 732, a groove which is shaped arc-like when viewed in section is bore spirally. Then, the ball nut 732 is inserted into a through-hole provided in the guide support member 93 and is fixed. The groove bored in the inner peripheral surface of the ball nut 732 faces the groove bored in the outer peripheral surface of the spiral shaft 731 so as to form a spiral space which is circular when viewed in section.

Each of the steel balls 733 is a spherical member interposed in the spiral space. The steel balls 733 are pinched between the groove bored in the spiral shaft 731 and the groove bored in the ball nut 732. Since the plurality of the steel balls 733 are interposed in the spiral space, the ball nut 732 is not shaky.

According to the construction, the movement mechanism 70 can transmit the rotational power of the electric motor to the spiral shaft 731 via the rotational cylinder 71 and the intermediate shaft 72 and exchange the rotational action of the spiral shaft 731 into the sending action of the guide support member 93. Accordingly, the movement mechanism 70 realizes the sending action of the guide support member 93 so as to move the second fiber bundle guides 92, which is supported by the guide support member 93, substantially perpendicularly to the rotational axis Ra of the liner 1.

The rotation mechanism 80 rotates the second fiber bundle guide 92 centering on the axis of the second fiber bundle guide 92. The rotation mechanism 80 mainly includes a rotational cylinder 81, an intermediate shaft 82 and a driving shaft 83.

The rotational cylinder 81 is a circular member whose inner peripheral surface is formed therein with an internal gear. The rotational cylinder 81 is arranged coaxially to the rotational axis Ra of the liner 1 and is rotated by an electric motor (not shown) (see the outlined black arrow in FIG. 4A and FIG. 5A). The rotational direction of the rotational cylinder 81 is changed by the normal or reverse rotation the electric motor.

The intermediate shaft 82 is a shaft-like member transmitting the rotational action of the rotational cylinder 81 to the driving shaft 83. A pinion gear provided at one of the ends of the intermediate shaft 82 is meshed with the internal gear of the rotational cylinder 81. A bevel gear provided at the other end of the intermediate shaft 82 is meshed with a bevel gear of the driving shaft 83.

The driving shaft 83 is a shaft-like member transmitting the rotational action of the intermediate shaft 82 to the second fiber bundle guide 92. The bevel gear provided at one of the ends of the driving shaft 83 is meshed with the bevel gear of the intermediate shaft 82 as mentioned above. A driving gear engaged with the outside of the driving shaft 83 is meshed with a driven gear of the second fiber bundle guide 92. The driving shaft 83 is supported rotatably by the circular member 46 which is C-like shaped when viewed in section.

According to the construction, the rotation mechanism 80 can transmit the rotational power of the electric motor to the driving shaft 83 via the rotational cylinder 81 and the intermediate shaft 82 so as to rotate the driving gear meshed with the driven gear of the second fiber bundle guide 92. Accordingly, the rotation mechanism 80 can rotate the second fiber bundle guides 92, which is supported by the guide support member 93, centering on the axis of the second fiber bundle guide 92.

An explanation will be given on the reason how the interval between the first fiber bundle guides 91 and the second fiber bundle guides 92 in the FW device 100 constructed as the above.

Firstly, an explanation will be given on the case in which the first fiber bundle guides 91 and the second fiber bundle guides 92 are moved so as to be close to the rotational axis Ra of the liner 1.

FIG. 4A and FIG. 4B show the state in which the first fiber bundle guide 91 and the second fiber bundle guide 92 are moved so as to be close to the rotational axis Ra of the liner 1. FIG. 4A and FIG. 4B are respectively a front view and a side view of that state. Arrows C in the drawings show the moving directions of the fiber bundle guides 91 and 92. Arrows D in the drawings show the moving direction of the movable helical head 44.

As shown in FIG. 4A and FIG. 4B, when the fiber bundles F are wound onto a part of the liner 1 with small diameter, the first fiber bundle guide 91 and the second fiber bundle guide 92 are moved so as to be close to the rotational axis Ra of the liner 1 (see the arrows C).

In this case, the interval between the first fiber bundle guide 91 and the second fiber bundle guide 92 becomes small gradually following the movement toward the rotational axis Ra of the liner 1, whereby the interference between the fiber bundle guides 91 and 92 which are adjacent to each other must be prevented.

Then, in the FW device 100, when the first fiber bundle guide 91 and the second fiber bundle guide 92 are moved so as to be close to the rotational axis Ra of the liner 1 (see the arrows C), the movable helical head 44 is driven so as to be separated from the fixed helical head 43 (see the arrows D).

Namely, when a plane, which is perpendicular to the rotational axis Ra of the liner 1 and intersects a guiding opening 91a of the first fiber bundle guide 91, is determined as a virtual plane Pf and a plane, which is perpendicular to the rotational axis Ra of the liner 1 and intersects a guiding opening 92a of the second fiber bundle guide 92, is determined as a virtual plane Pw, the FW device 100 drives the movable helical head 44 so as to separate the virtual plane Pw from the virtual plane Pf.

According to the construction, in the FW device 100, when the fiber bundle guides 91 and 92 are moved so as to be close to the rotational axis Ra of the liner 1, the interval in the direction of the rotational axis Ra of the liner 1 (the longitudinal direction) between the first fiber bundle guide 91 and the second fiber bundle guide 92 can be increased. Accordingly, in the FW device 100, the interval between the first fiber bundle guide 91 and the second fiber bundle guide 92 which are adjacent to each other can be optimized so as to prevent the interference.

Next, an explanation will be given on the case in which the first fiber bundle guides 91 and the second fiber bundle guides 92 are moved so as to be separated from the rotational axis Ra of the liner 1.

FIG. 5A and FIG. 5B show the state in which the first fiber bundle guide 91 and the second fiber bundle guide 92 are moved so as to be separated from the rotational axis Ra of the liner 1. FIG. 5A and FIG. 5B are respectively a front view and a side view of the state. Arrows C in the drawings show the moving directions of the fiber bundle guides 91 and 92. Arrows D in the drawings show the moving direction of the movable helical head 44.

As shown in FIG. 5A and FIG. 5B, when the fiber bundles F is wound onto a part of the liner 1 with large diameter, the first fiber bundle guide 91 and the second fiber bundle guide 92 are moved so as to be separated from the rotational axis Ra of the liner 1 (see the arrows C).

In this case, the interval between the first fiber bundle guide 91 and the second fiber bundle guide 92 becomes large gradually following the movement being separated from the rotational axis Ra of the liner 1, whereby the second fiber bundle guide 92 can be moved to an optimal position at which the winding form of the fiber bundles F is good.

Accordingly, in the FW device 100, when the first fiber bundle guide 91 and the second fiber bundle guide 92 are moved so as to be separated from the rotational axis Ra of the liner 1 (see the arrows C), the movable helical head 44 is driven so as to be close to the fixed helical head 43 (see the arrows D).

Namely, when the plane, which is perpendicular to the rotational axis Ra of the liner 1 and intersects the guiding opening 91a of the first fiber bundle guide 91, is determined as the virtual plane Pf and the plane, which is perpendicular to the rotational axis Ra of the liner 1 and intersects the guiding opening 92a of the second fiber bundle guide 92, is determined as the virtual plane Pw, the FW device 100 drives the movable helical head 44 so as to make the virtual plane Pw close to the virtual plane Pf.

According to the construction, in the FW device 100, when the fiber bundle guides 91 and 92 are moved so as to be separated from the rotational axis Ra of the liner 1, the interval in the direction of the rotational axis Ra of the liner 1 (the longitudinal direction) between the first fiber bundle guide 91 and the second fiber bundle guide 92 can be reduced. Accordingly, in the FW device 100, the interval in the direction of the rotational axis Ra of the liner 1 (the longitudinal direction) between the first fiber bundle guide 91 and the second fiber bundle guide 92 which are adjacent to each other can be minimized so as to make the winding form of the fiber bundles F good. The reason why the winding form of the fiber bundles F is made good will be discussed later.

Next, an explanation will be given on the winding mode of the fiber bundles F wound onto the outer peripheral surface 1S of the liner 1.

Firstly, an explanation will be given on the winding form of the fiber bundles F when the first fiber bundle guide 91 and the second fiber bundle guide 92 are moved so as to be close to the rotational axis Ra of the liner 1.

Figure 6:
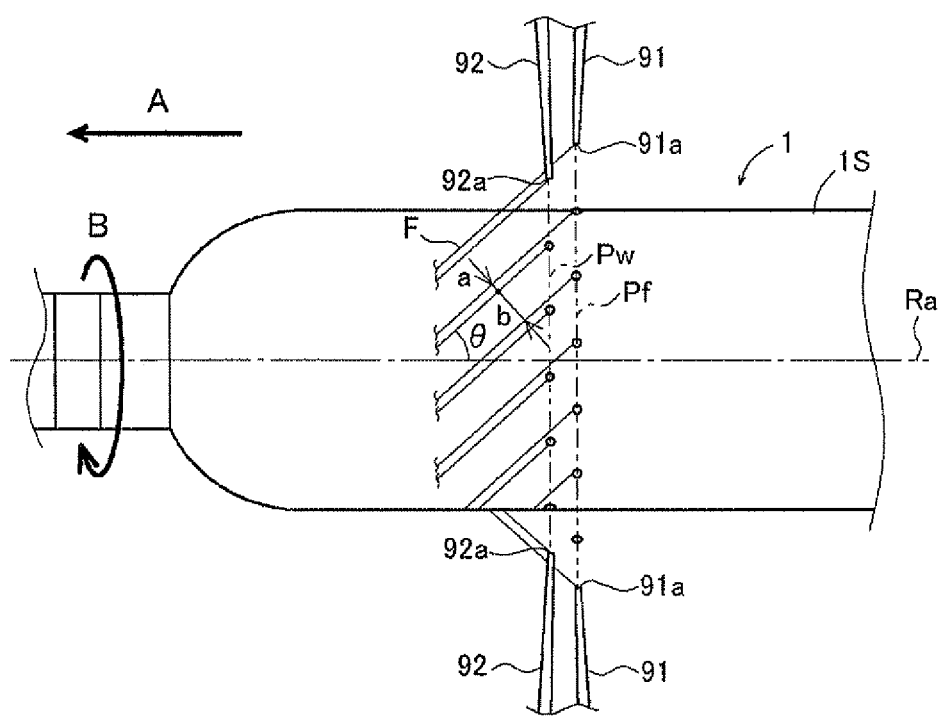
FIG. 6 is a drawing of winding mode of a fiber bundle F when the first fiber bundle guide 91 and the second fiber bundle guide 92 are moved so as to be close to the rotational axis Ra of the liner 1.

FIG. 6 shows the winding form of the fiber bundles F when the first fiber bundle guide 91 and the second fiber bundle guide 92 are moved so as to be close to the rotational axis Ra of the liner 1. An arrow A in the drawing shows the transport direction of the liner 1. An arrow B in the drawing shows the rotation direction of the liner 1. For convenience, FIG. 6 shows the state in that the fiber bundles F is wound onto a part at which the outer diameter is uniform.

As mentioned above, in the FW device 100, when the first fiber bundle guide 91 and the second fiber bundle guide 92 are moved so as to be close to the rotational axis Ra of the liner 1, the interval in the direction of the rotational axis Ra of the liner 1 (the longitudinal direction) between the first fiber bundle guide 91 and the second fiber bundle guide 92 is increased.

Then, as shown in FIG. 6, the fiber bundles F guided by the fiber bundle guides 91 and 92 are wound onto the outer peripheral surface 1S of the liner 1 not at equal intervals but partially. Namely, the fiber bundle F guided by the second fiber bundle guide 92 cannot be drawn to a middle position between the fiber bundles F guided by the first fiber bundle guide 91, whereby the fiber bundles F cannot be wound at equal intervals (see FIG. 6: a≠b).

Then, in the FW device 100, by adjusting the phase difference PA between the first fiber bundle guides 91 and the second fiber bundle guides 92 (see FIG. 4A and FIG. 5A), the fiber bundles F can be wound onto the outer peripheral surface 1S of the liner 1 at equal intervals.

Figure 7:
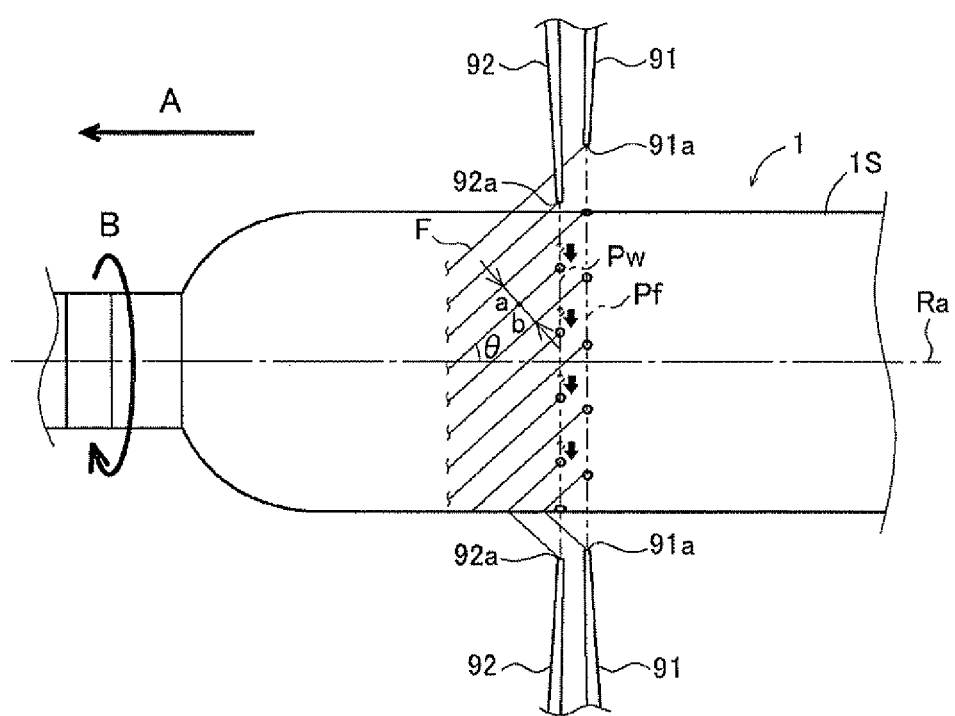
FIG. 7 is a drawing in which a phase difference PA between the first fiber bundle guides 91 and the second fiber bundle guides 92 is reduced so as to wind the fiber bundle F at equal intervals.

Concretely, in the FW device 100, the movable helical head 44 is driven by the driving device 60 so as to reduce the phase difference PA between the first fiber bundle guides 91 and the second fiber bundle guides 92. Accordingly, as shown in FIG. 7, the fiber bundles F guided by the second fiber bundle guides 92 can be shifted in the peripheral direction of the liner 1. Thick black arrows in FIG. 7 show the driving direction of the movable helical head 44 by the driving device 60.

According to the construction, in the FW device 100, the fiber bundle F guided by the second fiber bundle guides 92 can be drawn to the middle position between the fiber bundles F guided by the first fiber bundle guides (see FIG. 7: a=b). Accordingly, in the FW device 100, the winding form of the fiber bundles F can be made good.

Next, an explanation will be given on the winding form of the fiber bundles F when the first fiber bundle guide 91 and the second fiber bundle guide 92 are moved so as to be separated from the rotational axis Ra of the liner 1.

Figure 8:
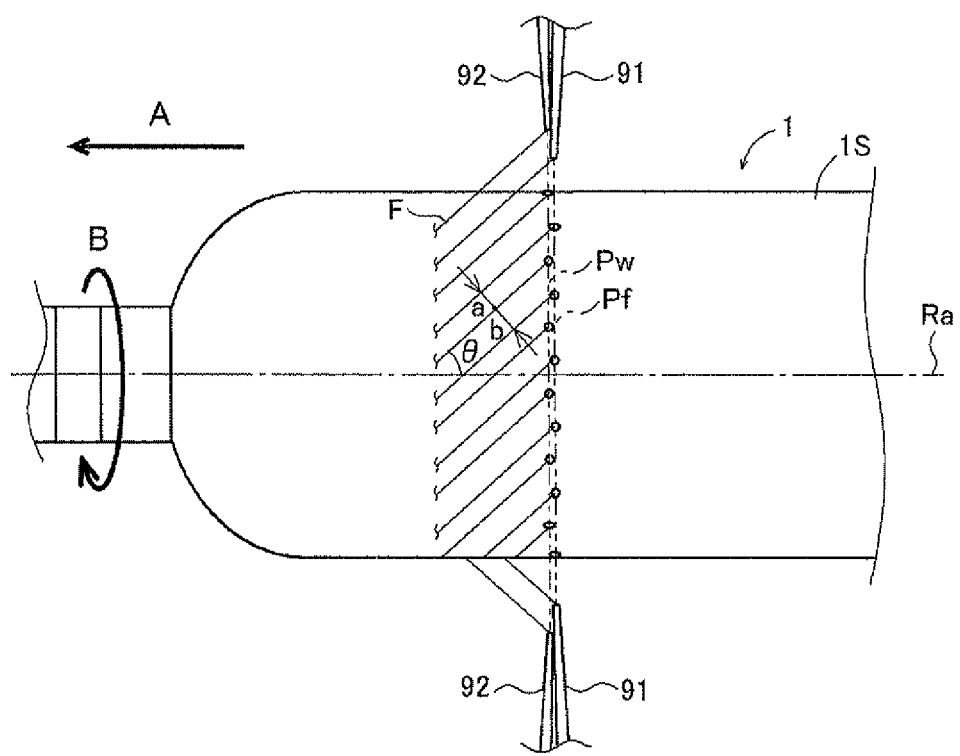
FIG. 8 is a drawing of the winding mode of the fiber bundle F when the first fiber bundle guide 91 and the second fiber bundle guide 92 are moved so as to be separated from the rotational axis Ra of the liner 1.

FIG. 8 shows the winding form of the fiber bundles F when the first fiber bundle guide 91 and the second fiber bundle guide 92 are moved so as to be separated from the rotational axis Ra of the liner 1. An arrow A in the drawing shows the transport direction of the liner 1. An arrow B in the drawing shows the rotation direction of the liner 1. For convenience, FIG. 8 shows the state that the fiber bundles F is wound onto a part at which the outer diameter is uniform.

As mentioned above, in the FW device 100, when the first fiber bundle guide 91 and the second fiber bundle guide 92 are moved so as to be separated from the rotational axis Ra of the liner 1, the interval in the direction of the rotational axis Ra of the liner 1 (the longitudinal direction) between the first fiber bundle guide 91 and the second fiber bundle guide 92 is reduced.

Then, as shown in FIG. 8, the fiber bundles F guided by the fiber bundle guides 91 and 92 are wound onto the outer peripheral surface 1S of the liner 1 at equal intervals. Namely, the fiber bundle F guided by the second fiber bundle guide 92 can be drawn to a middle position between the fiber bundles F guided by the first fiber bundle guide 91, whereby the fiber bundles F can be wound at equal intervals (see FIG. 8: a=b).

According to the construction, in the FW device 100, the fiber bundle F guided by the second fiber bundle guides 92 can be drawn to the middle position between the fiber bundles F guided by the first fiber bundle guides (see FIG. 8: a=b). Accordingly, in the FW device 100, the winding form of the fiber bundles F can be made good.

INDUSTRIAL APPLICABILITY

The filament winding device according to the present invention can optimize the interval between the fiber bundle guides adjacent to each other, whereby the filament winding device is useful industrially.

DESCRIPTION OF NOTATIONS 1 liner
1S outer peripheral surface
10 main pedestal
20 liner transport device
30 hoop winding device
40 helical winding device
43 helical head (first helical head, fixed helical head)
44 helical head (second helical head, movable helical head)
45 guide support device
50 interval adjusting means (driving device)
51 electric motor 52 worm gear
53 rack gear
60 phase adjusting means (driving device)
61 electric motor
62 worm gear
63 rack gear
70 movement mechanism
71 rotational cylinder
72 intermediate shaft
73 ball screw
80 rotation mechanism
81 rotational cylinder
82 intermediate shaft
83 driving shaft
91 fiber bundle guide (first fiber bundle guide)
92 fiber bundle guide (second fiber bundle guide)
93 guide support member
100 filament winding device (FW device)
F fiber bundle
Pf virtual plane
Pw virtual plane
θ winding angle

The invention claimed is:

1. A filament winding device comprising:
a plurality of helical heads in which fiber bundle guides moved substantially perpendicularly to a rotational axis of a liner are provided radially, wherein the liner passes through the helical heads while being rotated so as to wind a fiber bundle onto an outer peripheral surface of the liner, and
an interval adjusting means that adjusts an interval between a virtual plane perpendicular to the rotational axis of the liner and intersecting a guiding opening of a fiber bundle guide provided in one of the helical heads and a virtual plane perpendicular to the rotational axis of the liner and intersecting a guiding opening of a fiber bundle guide provided in another helical head.

2. The filament winding device according to claim 1, wherein when the fiber bundle guide is moved so as to be close to the rotational axis of the liner, the interval adjusting means separates the virtual plane perpendicular to the rotational axis of the liner and intersecting the guiding opening of the fiber bundle guide provided in the another helical head from the virtual plane perpendicular to the rotational axis of the liner and intersecting the guiding opening of the fiber bundle guide provided in the one of the helical heads.

3. The filament winding device according to claim 1, wherein when the fiber bundle guide is moved so as to be separated from the rotational axis of the liner, the interval adjusting means makes the virtual plane perpendicular to the rotational axis of the liner and intersecting the guiding opening of the fiber bundle guide provided in the another helical head close to the virtual plane perpendicular to the rotational axis of the liner and intersecting the guiding opening of the fiber bundle guide provided in the one of the helical heads.

* * * * *